United States Patent
Cheung et al.

(10) Patent No.: US 11,408,460 B2
(45) Date of Patent: Aug. 9, 2022

(54) TOLERANCE COMPENSATOR

(71) Applicant: Tesla, Inc., Palo Alto, CA (US)

(72) Inventors: Jason A. Cheung, Castro Valley, CA (US); Richard J. Driscoll, San Rafael, CA (US)

( * ) Notice: Subject to any disclaimer, the term of this patent is extended or adjusted under 35 U.S.C. 154(b) by 10 days.

(21) Appl. No.: 16/177,231

(22) Filed: Oct. 31, 2018

(65) Prior Publication Data

US 2019/0128311 A1     May 2, 2019

Related U.S. Application Data

(60) Provisional application No. 62/579,772, filed on Oct. 31, 2017.

(51) Int. Cl.
| | | |
|---|---|---|
| *F16B 35/00* | (2006.01) | |
| *F16B 35/04* | (2006.01) | |
| *F16B 5/02* | (2006.01) | |
| *F16B 43/00* | (2006.01) | |
| *F16B 31/02* | (2006.01) | |

(52) U.S. Cl.
CPC .......... *F16B 35/042* (2013.01); *F16B 5/025* (2013.01); *F16B 5/0275* (2013.01); *F16B 43/009* (2013.01); *F16B 5/0233* (2013.01); *F16B 31/024* (2013.01); *F16B 2200/503* (2018.08)

(58) Field of Classification Search
CPC ...... F16B 5/025; F16B 5/0275; F16B 5/0233; H01L 23/3735
USPC ........................................................ 411/389
See application file for complete search history.

(56) References Cited

U.S. PATENT DOCUMENTS

| | | | | |
|---|---|---|---|---|
| 4,304,503 | A * | 12/1981 | Gehring | F16B 35/04 29/525.04 |
| 6,592,311 | B2 * | 7/2003 | Wojciechowski | B23P 19/062 411/107 |
| 6,669,422 | B1 * | 12/2003 | Sterle | F16B 5/0233 411/178 |
| 6,827,538 | B2 * | 12/2004 | Doppke | F16B 39/30 411/311 |
| 7,241,097 | B2 * | 7/2007 | Dembowsky | F16B 5/0233 411/34 |
| 7,294,019 | B1 * | 11/2007 | Jeon | H01R 13/6658 439/108 |
| 7,386,960 | B2 * | 6/2008 | Molteni | E04B 2/7433 160/135 |
| 8,641,343 | B2 * | 2/2014 | Mitrovic | F16B 37/122 411/338 |
| 8,861,203 | B2 * | 10/2014 | Fang | G06F 1/20 361/719 |
| 8,920,091 | B2 * | 12/2014 | Heinrich | F16B 5/0275 411/371.1 |
| 9,133,870 | B2 * | 9/2015 | Spolyar | F16B 5/0233 |

(Continued)

*Primary Examiner* — Gary W Estremsky
(74) *Attorney, Agent, or Firm* — Knobbe Martens Olson & Bear LLP (57) ABSTRACT

A disclosed tolerance compensator system reduces or avoids bending of components when the components are fastened to each other, thereby increasing the reliability of the components. The limited number of parts of the tolerance compensator system simplifies manufacturing and reduces costs. A disclosed method for fastening components together using the tolerance compensator system reduces or avoids bending of components, increases the reliability of the components, reduces fastening times, and simplifies fastening procedures.

16 Claims, 9 Drawing Sheets

(56) References Cited

U.S. PATENT DOCUMENTS

| | | | |
|---|---|---|---|
| 10,309,435 B2 * | 6/2019 | Couto Maquieira | F16B 5/0233 |
| 2014/0328645 A1 * | 11/2014 | Arisa Busquets | F16B 5/0233 411/366.1 |

* cited by examiner

TOLERANCE COMPENSATOR

CROSS-REFERENCE TO RELATED APPLICATIONS

This application claims priority to U.S. Provisional Patent Application No. 62/579,772, titled "TOLERANCE COMPENSATOR," filed Oct. 31, 2017, the content of which is incorporated by reference in its entirety for all purposes.

FIELD

The present disclosure relates generally to tolerance compensators, and more specifically to tolerance compensators for fastening a heat sink to a mounting plate.

BACKGROUND

Integrated circuits (ICs) are typically mounted on a circuit board, such as a printed circuit board (PCB) using standoffs. Heat sinks are often used to dissipate some of the heat generated by the IC. Heat sinks are typically thermally coupled to the IC by way of a thermal interface material (TIM) layer. The TIM is a material with high thermal conductivity. The TIM enhances the thermal coupling between the IC and the heat sink by, for example, filling gaps between the surface of the IC and the surface of the heat sink. Subsequently fastening the heat sink to a component, such as a plate, provides advantages, such as ease of handling and reduction of load risk during installation of the system.

However, some techniques for fastening components together, such as fastening a heat sink to a mounting plate, result in undesirable bending of the components, such as the PCB and/or the IC. This bending is often caused by manufacturing tolerances and can result in reduced reliability of the IC, such as reduced performance or failure of the IC. For example, bending of the IC can cause components of the IC to fail. This is particularly problematic for high-performance ICs. For another example, bending of the PCB can cause a loss of bonding between the IC and the PCB. This is particularly problematic when the IC and PCB have different bending stiffnesses.

A technique for mitigating the reliability risks of the bending that occurs during the fastening procedure is to use an increased TIM gap, which helps to reduce bending of the PCB. However, an increased TIM gap has undesirable effects, such as reduced thermal performance of the PCB, which can also lead to reduced reliability of the IC. Further, an increased TIM gap does not sufficiently address potential loss of bonding between the IC and the PCB caused by bending of the PCB.

BRIEF SUMMARY

Accordingly, the present techniques provide systems and processes to compensate for manufacturing tolerances when fastening components together, thereby reducing or eliminating bending of the components. For example, the present techniques provide systems and processes that reduce or eliminate bending of the IC and PCB when fastening a heat sink to a mounting plate, thereby helping to avoid reliability risks associated with bending of the IC and PCB while maintaining a reduced TIM gap.

In accordance with some embodiments, a tolerance compensator system for fastening components together is described. The system comprises a threaded stud and a nut. The threaded stud has a first end, a second end, a first portion adjacent to the first end, a second portion adjacent to the second end, and a flange. The first portion is threaded in a first direction and the second portion is threaded in a second direction different from the first direction. The flange is arranged between the first portion and the second portion. The nut is threaded in the second direction.

In accordance with some embodiments, a method for fastening a first component to a second component using a tolerance compensator system is described. The method comprises: inserting a first end of a stud into a threaded hole of the first component, wherein the threaded hole of the first component is threaded in a first direction; at least partially screwing a first portion of the stud that is adjacent to the first end of the stud into the threaded hole of the first component, wherein: the first portion is threaded in the first direction, and the first portion and the threaded hole of the first component have a first coefficient of friction; inserting a second end of the stud through a hole of a second component and inserting part of a second portion of the stud through the hole of the second component, wherein: the second portion of the stud is adjacent to the second end of the stud, and the second portion of the stud is threaded in a second direction different from the first direction; while part of the second portion remains inserted through the hole of the second component, placing a nut onto the second end of the stud, wherein: the nut is threaded in the second direction, and the second portion and a threaded hole of the nut have a second coefficient of friction that is greater than the first coefficient of friction; and rotating the nut to cause: the stud to rotate until a flange of the stud reaches a first side of the second component by partially unscrewing the first portion from the threaded hole of the first component, wherein the flange is arranged between the first portion and the second portion, and subsequent to the flange of the stud reaching the second component, the nut to screw onto the second portion until the nut reaches a second side of the second component.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary devices, methods, parameters, and the like. It should be recognized, however, that such description is not intended as a limitation on the scope of the present disclosure, but is instead provided as a description of exemplary embodiments.

Figure 1:
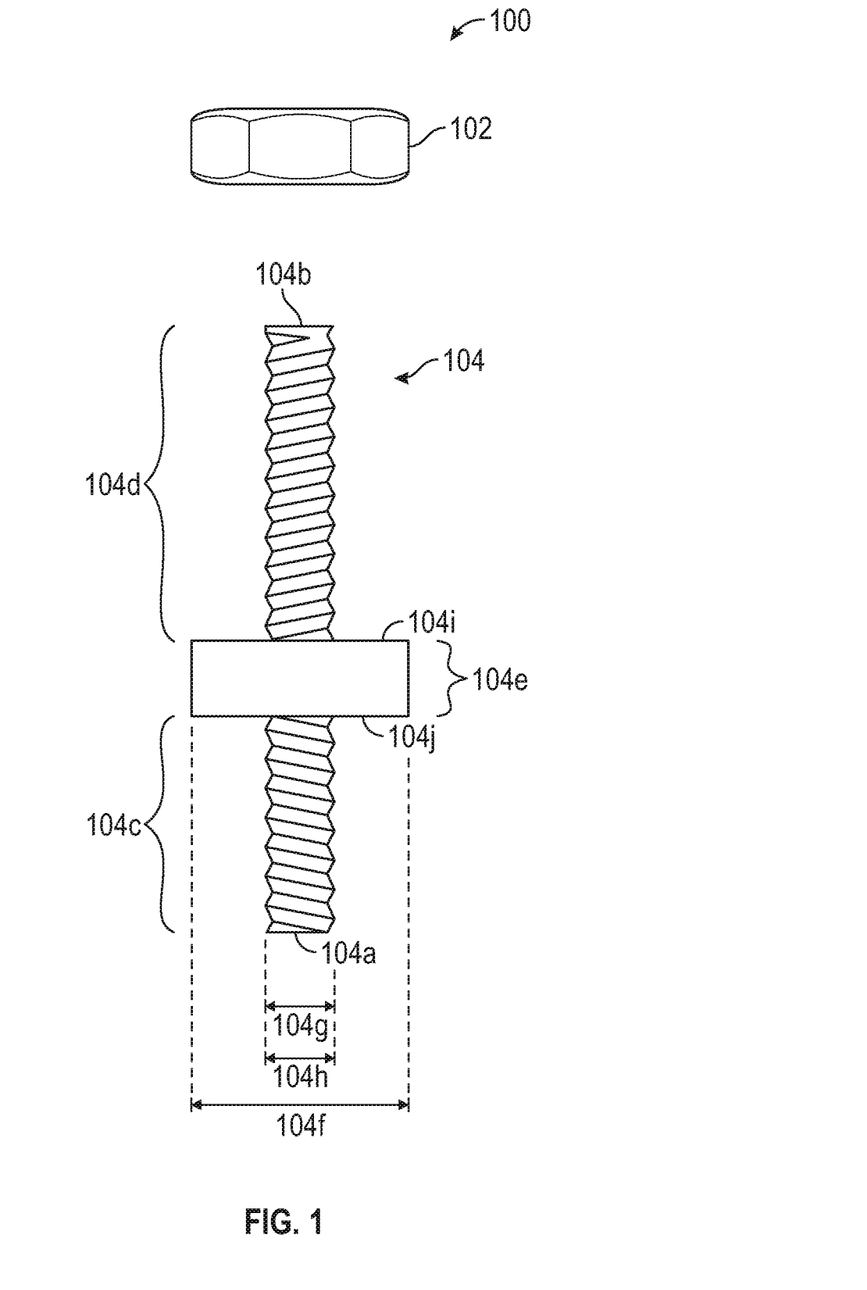
FIG. 1 illustrates an exemplary tolerance compensator system for fastening components together.

FIG. 1 illustrates an exemplary tolerance compensator system 100 for fastening components together. Tolerance compensator system 100 includes nut 102 and a threaded stud 104.

Threaded stud 104 is a single integral component that is optionally made of metal. Threaded stud 104 has a first end 104a and a second end 104b. Second end 104b is opposite first end 104a. First end 104a and second end 104b are not pointed (e.g., are substantially flat). Threaded stud 104 includes first portion 104c adjacent to first end 104a, second portion 104d adjacent to second end 104b, and flange 104e.

First portion 104c is threaded in a first direction (e.g., left-hand threaded). First portion 104c is substantially cylindrical. First portion 104c extends from first end 104a to flange 104e. First portion 104c has a diameter that is constant or substantially constant along the full length of first portion 104c. That is, the diameter of the stud does not vary along first portion 104c. First portion 104c is externally threaded.

Second portion 104d is threaded in a second direction (e.g., right-hand threaded) that is different from the first direction. Second portion 104d is also substantially cylindrical. Second portion 104d extends from second end 104b to flange 104e. Second portion 104d has a diameter that is constant or substantially constant along the full length of second portion 104d. That is, the diameter of the stud does not vary along second portion 104d. Second portion 104d is externally threaded.

In some examples, the diameter of first portion 104c is equal to the diameter of second portion 104d. In some examples, the diameter of first portion 104c is different from (e.g., larger than, smaller than) the diameter of second portion 104d. In some examples, the threading of first portion 104c and the threading of second portion 104d have the same pitch. In some examples, first portion 104c and second portion 104d have the same lead.

Flange 104e is arranged between first portion 104c and second portion 104d. In some examples, flange 104e is substantially cylindrical. In the case where flange 104e is substantially cylindrical, the diameter 104f of flange 104e is greater than both the diameter 104g of first portion 104c and the diameter 104h of second portion 104d. Flange 104e has a width 104f that is perpendicular to an axis along the longest dimension of stud 104. The width 104f of flange 104e is greater than the diameter 104g of first portion 104c and is greater than the diameter 104h of second portion 104d. Flange 104e is not threaded. A top portion 104i of flange 104e (e.g., facing second end 104b) and a bottom portion 104j of flange 104e (e.g., facing first end 104a) are flat or substantially flat.

Nut 102 is threaded in the second direction (e.g., right-hand threaded) and is configured to receive second portion 104d via second end 104b. Nut 102 is internally threaded. The threading of nut 102 and the threading of second portion 104d have the same pitch. The diameter of the threaded hole of nut 102 is constant or substantially constant for the full length of nut 102. The pitch of the threads of nut 102 is constant or substantially constant for the full length of nut 102.

In some examples, as described above, the tolerance compensator system 100 is limited to two components: nut 102 and stud 104. The limited number of parts reduces manufacturing costs, reduces fastening times, and simplifies fastening procedures. The two-component design is universally applicable, enabling fastening of various objects, made of various materials, and under various conditions.

FIGS. 2A-2L illustrate an exemplary technique for fastening heat sink 106 to plate 116 using tolerance compensator system 100. FIGS. 2A-2L illustrate a hybrid view for the better understanding of the reader. PCB 108 is fixed to a surface, such as by using a plurality of PCB mounts 110. IC 112 is electrically coupled to PCB 108. A layer of TIM 114 thermally couples IC 112 to heat sink 106. Heat sink 106 is fastened to PCB 108 using a plurality of rigid standoffs 106b. Heat sink 106 includes a left-hand threaded hole 106a. At FIG. 2A, stud 104 is not screwed into heat sink 106.

Figure 2A:
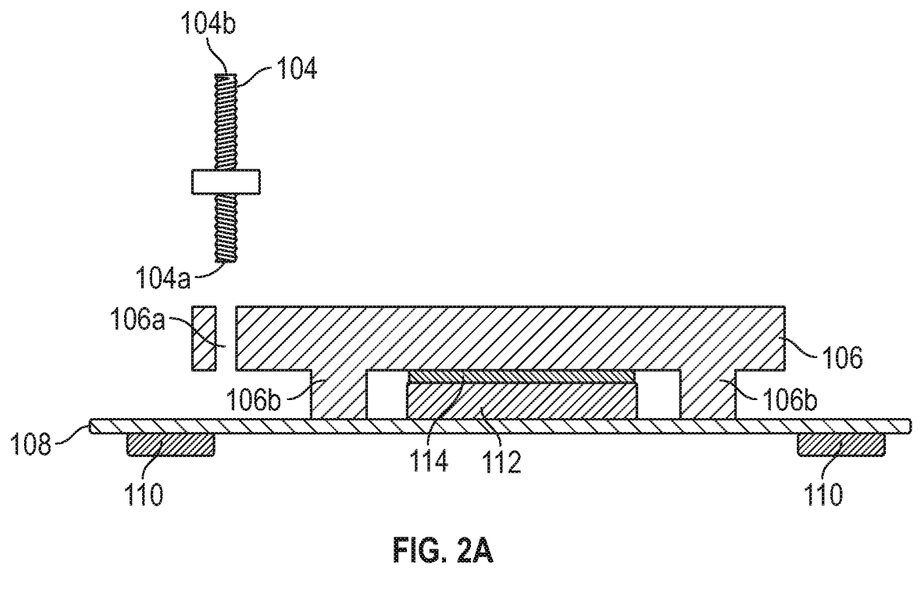
FIGS. 2A-2L illustrate an exemplary technique for fastening a heat sink to a plate using a tolerance compensator system.
Figure 2B:
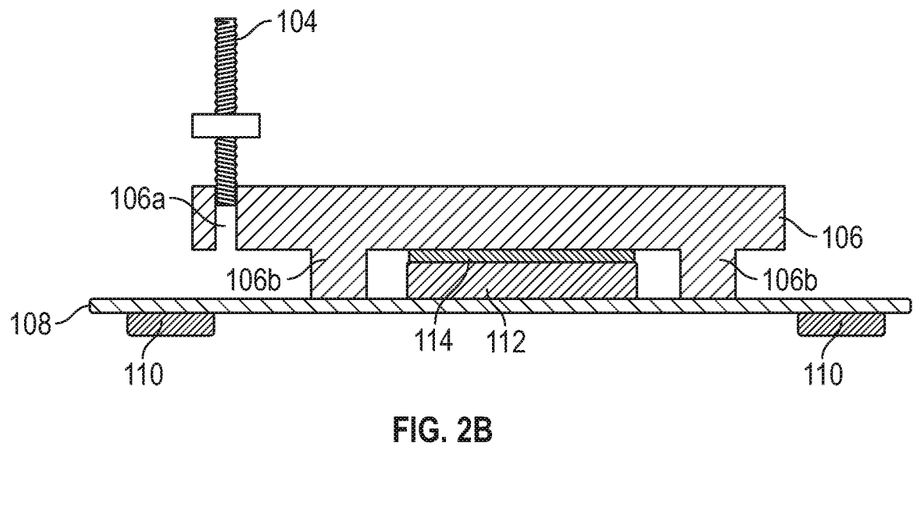
Figure 2C:
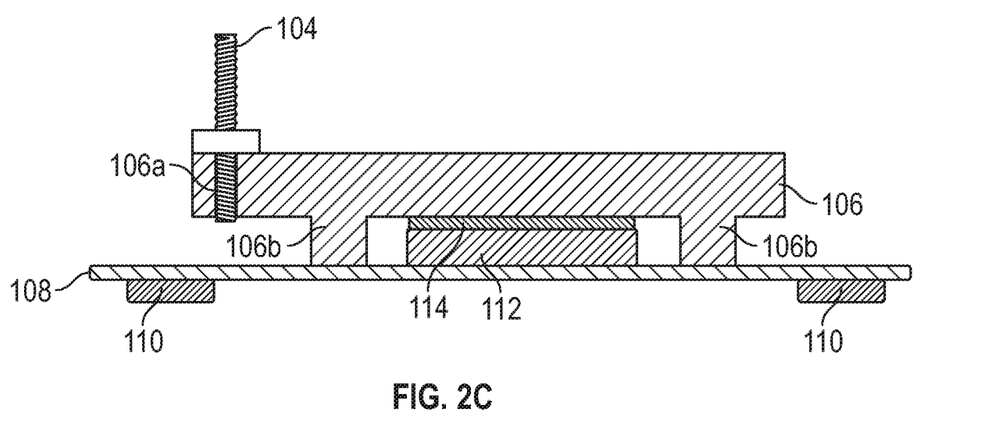

At FIGS. 2B-2C, first end 104a of stud 104 is inserted into threaded hole 106a and stud 104 is turned counter-clockwise to screw the first portion 104c of stud 104 into threaded hole 106a (e.g., without using nut 102). As illustrated in FIG. 2C, stud 104 is turned counter-clockwise, such as until flange 104e comes into contact with heat sink 106.

Figure 2D:
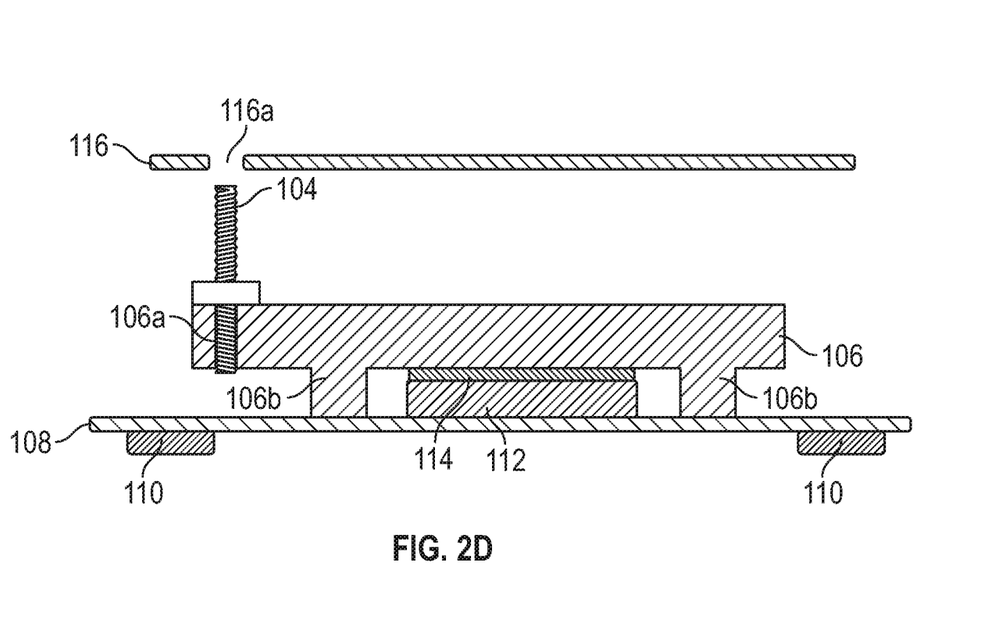
Figure 2E:
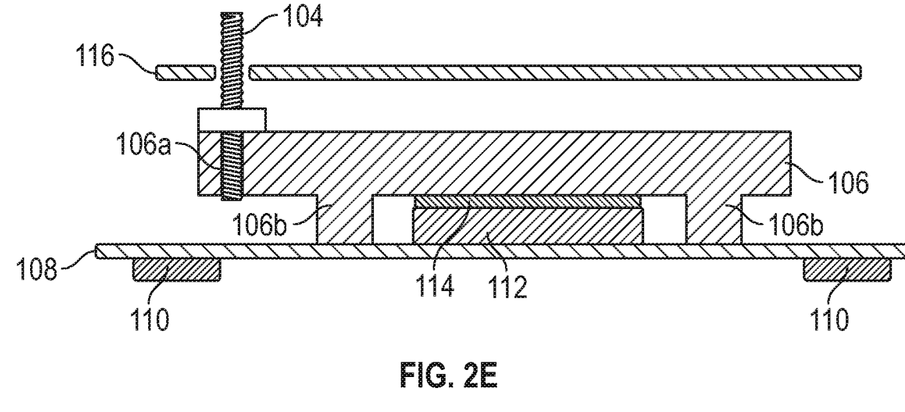

At FIGS. 2D-2E, while first portion 104c remains (at least partially) screwed into threaded hole 106a, second end 104b of stud 104 is inserted through plate 116 via hole 116a. Hole 116a is not threaded and does not engage the threads of second portion 104d of stud 104.

Figure 2F:
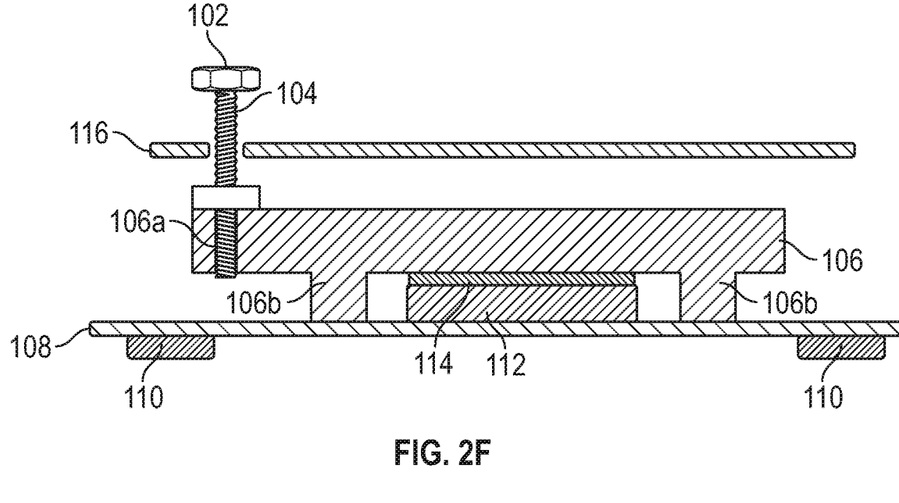

At FIG. 2F, while part of (e.g., not all of) second portion 104d is inserted through the hole of the plate 116, right-hand threaded nut 102 is placed onto second end 104b of stud 104. At FIGS. 2E-2F, a portion of second end 104b is positioned between plate 116 and heat sink 106.

Figure 2G:
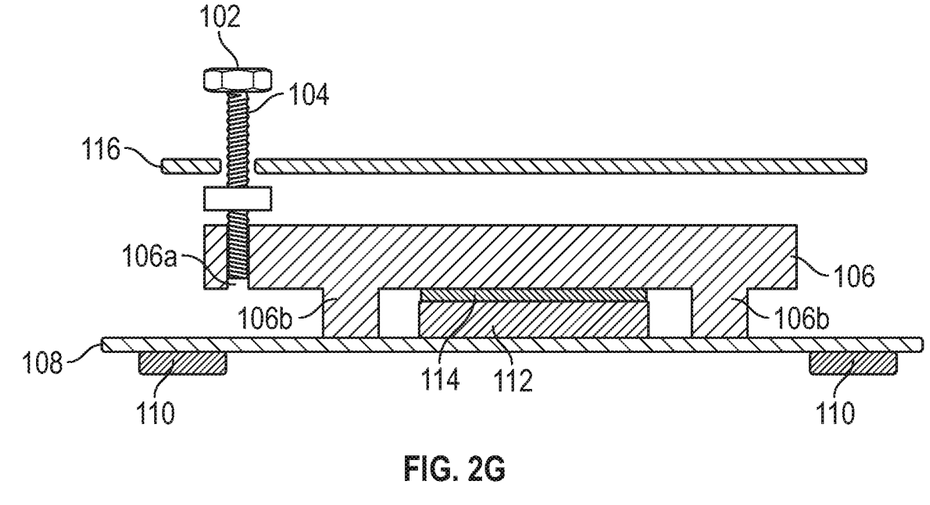
Figure 2H:
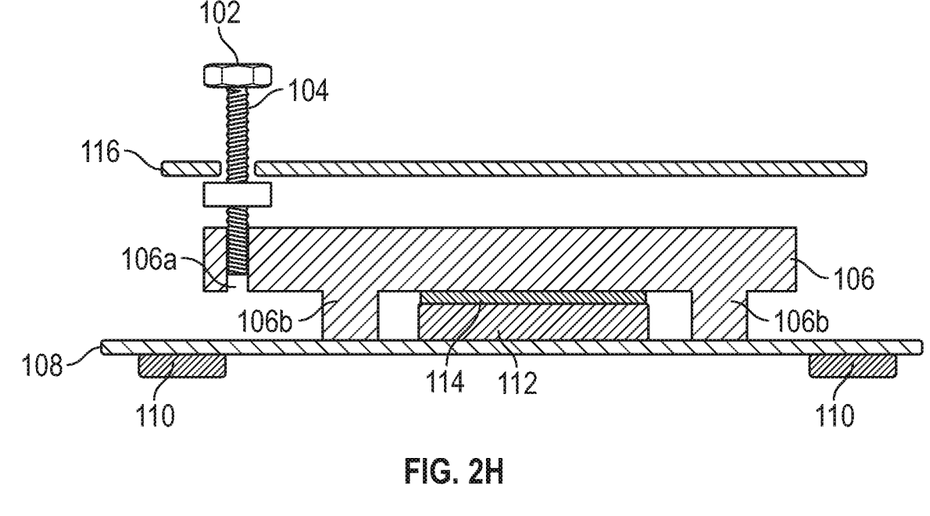
Figure 2I:
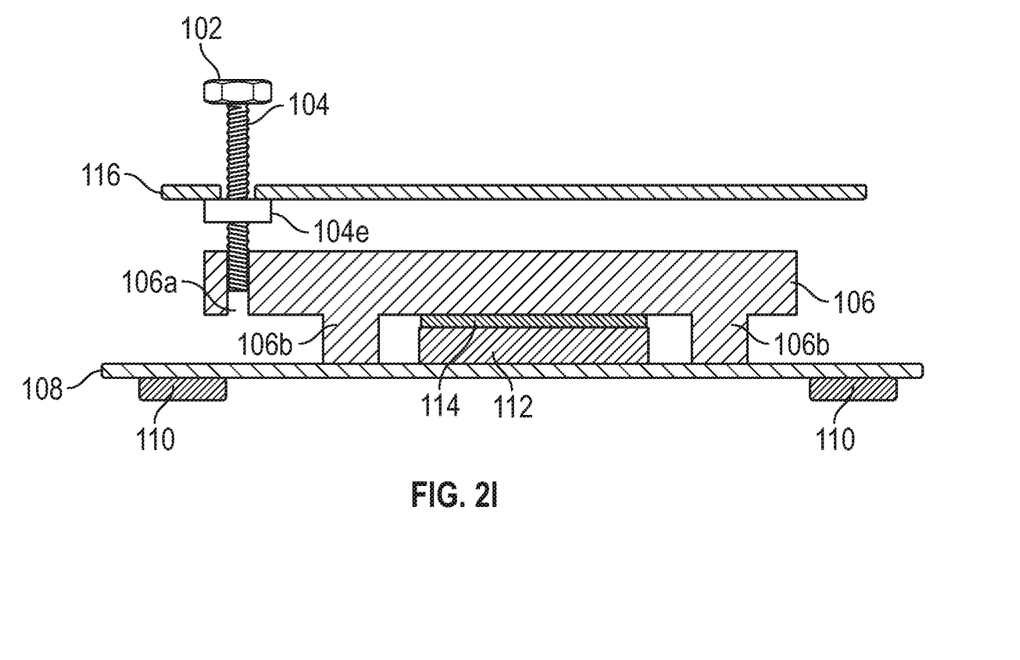

At FIGS. 2G-2I, nut 102 is rotated clockwise. Because the coefficient of friction between first portion 104c and threaded hole 106a is less than the coefficient of friction between nut 102 and second portion 104d, rotating nut 102 clockwise causes stud 104 to rotate clockwise. As a result of stud 104 rotating clockwise, first portion 104c of stud 104 unscrews from threaded hole 106a, raising the nut-stud 102-104 system until flange 104e reaches plate 116.

Figure 2J:
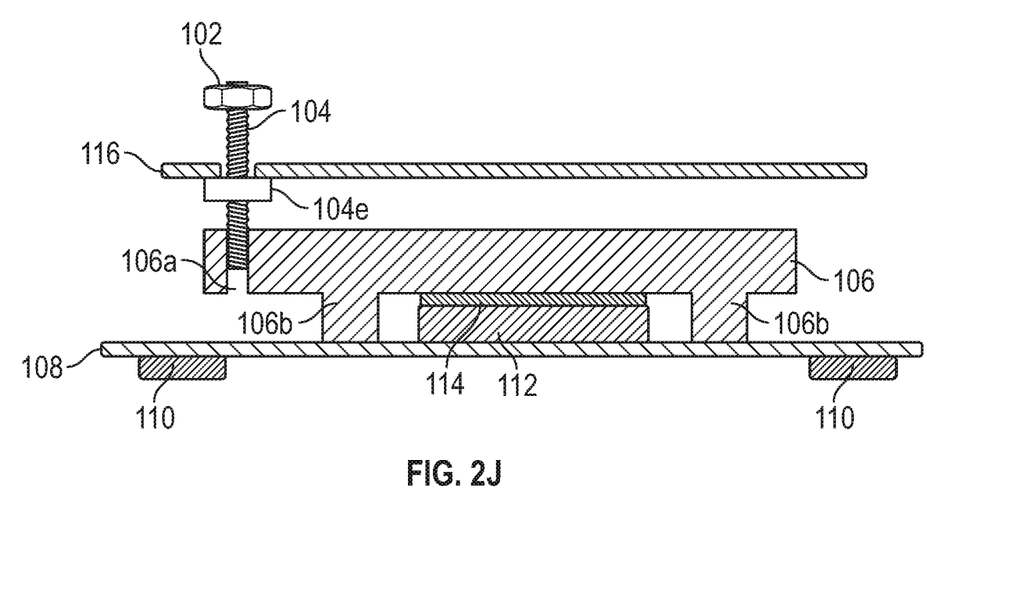
Figure 2K:
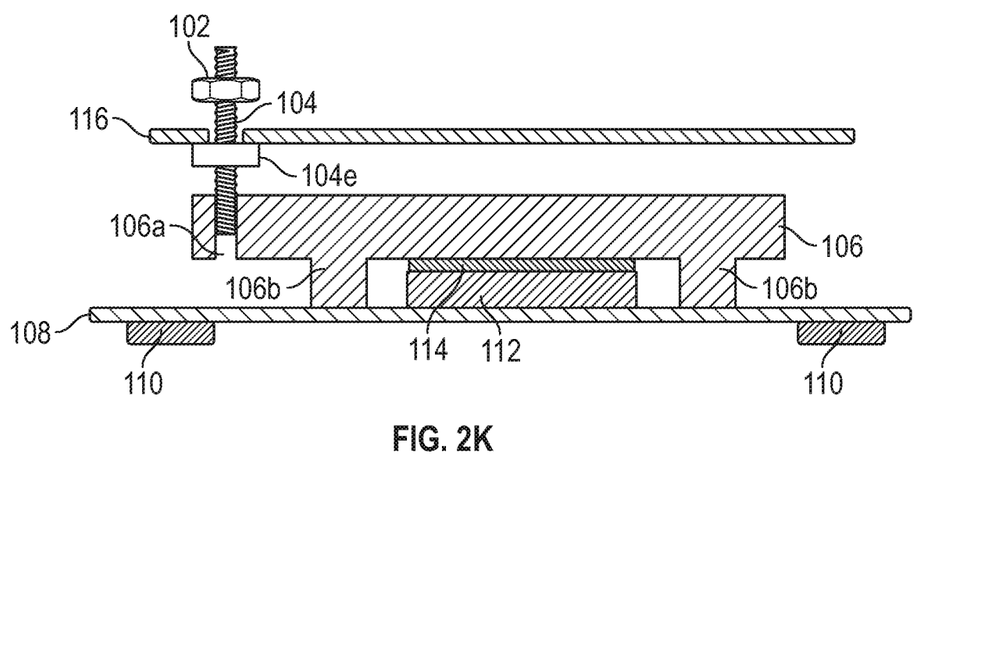
Figure 2L:
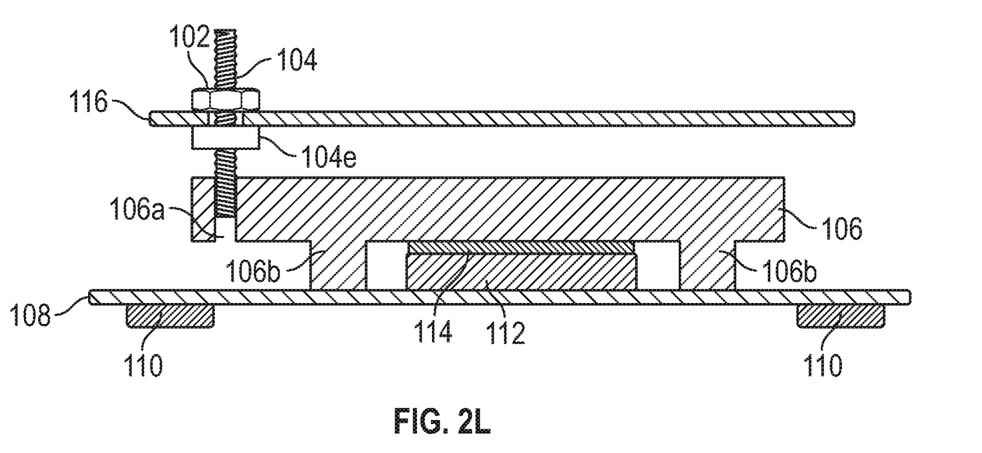

Once flange 104e reaches plate 116 (or, optionally, flange 104e and plate 116 are concurrently in contact with one or more dividers (e.g., washers) placed between flange 104e and plate 116), clockwise rotation of nut 102 does not cause the nut-stud 102-104 system to further unscrew from threaded hole 106a and rise. Instead, as illustrated in FIGS. 2J-2L, additional clockwise rotation of nut 102 causes nut 102 to screw onto the second portion 104d of stud 104 until nut 102 reaches plate 116 (or, optionally, nut 102 and plate 116 are concurrently in contact with one or more dividers (e.g., washers) placed between nut 102 and plate 116), thereby efficiently securing heat sink 106 to plate 116 while compensating for manufacturing tolerances.

Figure 3:
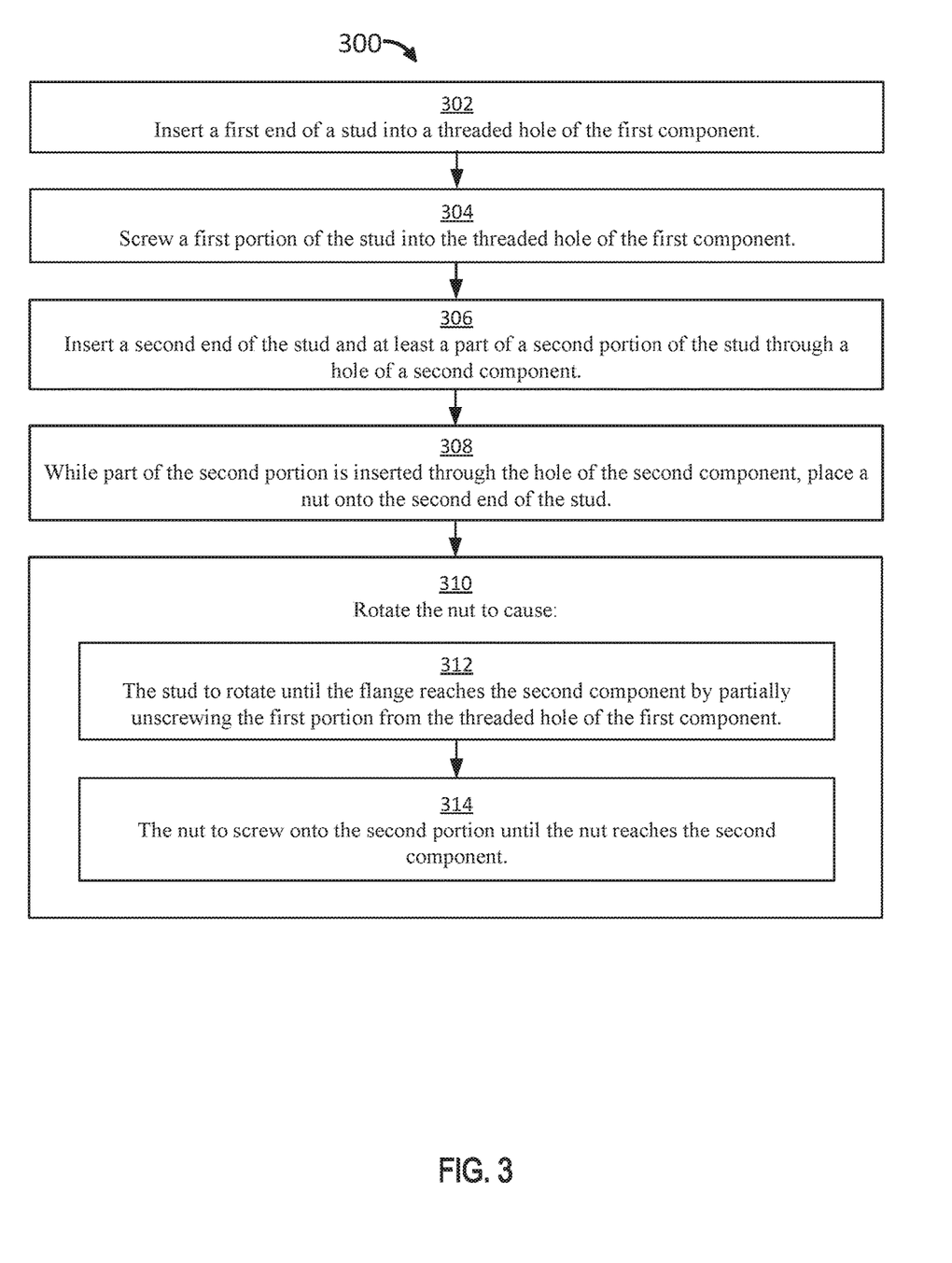
FIG. 3 illustrates an exemplary method for fastening a first component to a second component using a tolerance compensator system.

FIG. 3 illustrates an exemplary method 300 for fastening a first component (e.g., 106, 120) to a second component (e.g., 116, 122) using tolerance compensator system 100. The method reduces or avoids bending of components, reduces fastening times, and simplifies fastening procedures. Some operations in method 300 are, optionally, combined, the order of some operations is, optionally, changed, and some operations are, optionally, omitted. The operations of method 300 can be optionally combined with the operations described with respect to FIGS. 2A-2L.

At block 302, a first end (e.g., 104a) of a stud (e.g., 104) is inserted into a threaded hole (e.g., 106a) of a first component (e.g., 120, a heat sink 106 that is coupled to a PCB and IC). The threaded hole (e.g., 106a) of the first component (e.g., 106, 120) is threaded in a first direction (e.g., left-hand threaded).

At block 304, a first portion (e.g., 104c) of the stud (e.g., 104) that is adjacent to the first end (e.g., 104a) of the stud (e.g., 104) is at least partially (e.g., fully) screwed into the threaded hole (e.g., 106a) of the first component (e.g., 106, 120). The first portion (e.g., 104c) is threaded in the first direction (e.g., left-hand threaded). The first portion (e.g., 104c) and the threaded hole (e.g., 106a) of the first component (e.g., 106, 120) have a first coefficient of friction (e.g., to screw the first portion into the threaded hole, to unscrew the first portion out of the threaded hole).

At block 306, a second end (e.g., 104b) of the stud (e.g., 104) is inserted through a hole (e.g., 116a) of a second component (e.g., 122, a plate 116, a panel of an enclosure) and part of (e.g., not all of, without the flange of the stud coming into contact with the second component during the inserting) a second portion (e.g., 104d) of the stud is inserted through the hole (e.g., 116a) of the second component (e.g., 116, 122). The second portion (e.g., 104d) of the stud (e.g., 104) is adjacent to the second end (e.g., 104b) of the stud (e.g., 104). The second portion (e.g., 104d) of the stud (e.g., 104) is threaded in a second direction (e.g., right-hand threaded) different from the first direction.

At block 308, while part of (e.g., not all of) the second portion (e.g., 104d) remains inserted through the hole (e.g., 116a) of the second component (e.g., 116, 122), a nut (e.g., 102) is placed onto the second end (e.g., 104b) of the stud (e.g., 104). The nut (e.g., 102) is threaded in the second direction (e.g., right-hand threaded). The second portion (e.g., 104d) and a threaded hole of the nut (e.g., 102) have a second coefficient of friction that is greater than the first coefficient of friction (e.g., to screw the second portion into the nut).

At block 310, the nut is rotated (e.g., clockwise when the second portion is right-hand threaded, while the nut is situated on the second portion) to cause blocks 312 and 314 to occur.

At block 312, the stud (e.g., 104) rotates (e.g., clockwise, with the nut, one-to-one correspondence between rotation of the nut and rotation of the stud) until a flange (e.g., 104e) of the stud (e.g., 104) reaches a first side (e.g., bottom) of the second component (e.g., 106, 120) by partially (not fully) unscrewing the first portion (e.g., 104c) from the threaded hole (e.g., 106a) of the first component (e.g., 106, 120). The flange (e.g., 104e) is arranged between the first portion (e.g., 104c) and the second portion (e.g., 104d).

Subsequent to the flange (e.g., 104e) of the stud (e.g., 104) reaching the second component (e.g., 106, 120), the nut (e.g., 102) screws onto the second portion (e.g., 104d) (e.g., rotate around the second portion while the stud does not rotate) until the nut (e.g., 102) reaches a second side (e.g., top) of the second component (e.g., 116, 122).

In some embodiments, the hole (e.g., 116a) of the second component (e.g., 116) is not threaded.

In some embodiments, a diameter of the hole (e.g., 116a) of the second component (e.g., 116, 122) is larger than a diameter of the second portion (e.g., 104d) of the stud.

In some embodiments, inserting part of the second portion (e.g., 104d) of the stud (e.g., 104) through the hole (e.g., 116a) of the second component (e.g., 116, 122) does not including screwing the second portion (e.g., 104d) into the hole (e.g., 116a) of the second component (e.g., 116, 122).

In some embodiments, being threaded in the first direction is being left-hand threaded, being threaded in the second direction is being right-hand threaded. In some embodiments, rotating the nut (e.g., 102) includes rotating the nut (e.g., 102) clockwise.

In some embodiments, the first component is a heat sink (e.g., 106). The head sink (e.g., 106) is thermally coupled to an integrated circuit (e.g., 112) via a thermal interface material layer (e.g., 114). The integrated circuit (e.g., 112) is electrically coupled to a printed circuit board (e.g., 108). The heat sink (e.g., 106) is coupled to the printed circuit board (e.g., 108) via one or more (e.g., a plurality of) standoffs (e.g., 106b). In some embodiments, the second component (e.g., 116, 122) is a metal enclosure.

Figure 4:
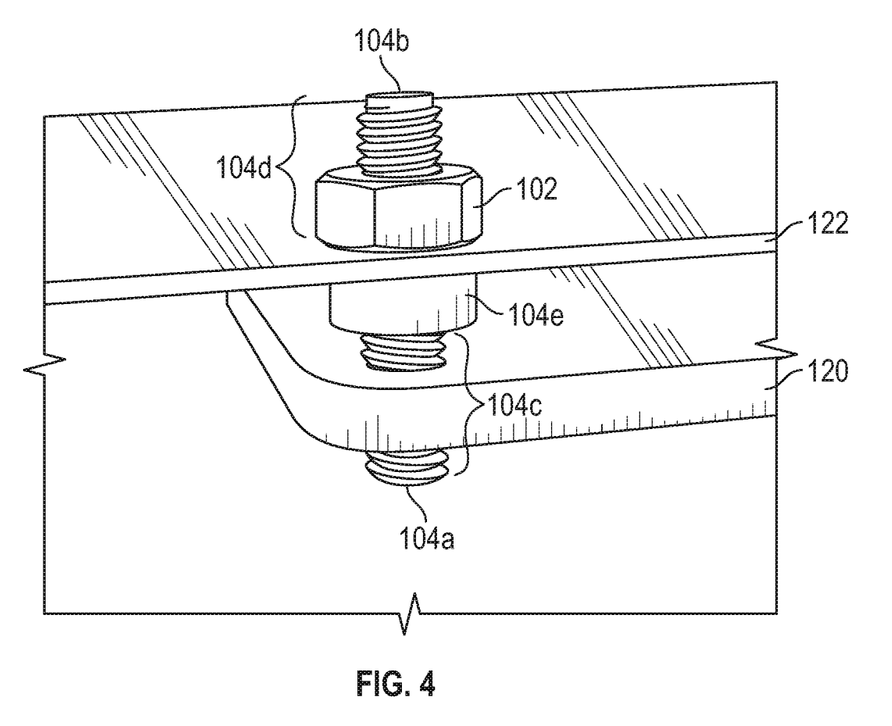
FIG. 4 illustrates an exemplary result of fastening first component to second component using a tolerance compensator system.

FIG. 4 illustrates an exemplary result of fastening first component 120 to second component 122 using tolerance compensator system 100, in accordance with the technique of method 300. In some examples, the technique of method 300 is carried out a plurality of times, once on each of a plurality of tolerance compensator systems 100 to fasten a first component to a second component using the plurality of tolerance compensator systems 100. For example, two studs 104 and two nuts 102 are optionally used to fasten a first component to a second component.

The foregoing description has been described with reference to specific embodiments. However, the illustrative discussions above are not intended to be exhaustive or to limit the inventions to the precise forms described. Many modifications and variations are possible in view of the above teachings. Others skilled in the art are thereby enabled to best utilize the techniques and various embodiments with various modifications as suited to various uses.

Although the disclosure and examples have been described with reference to the accompanying drawings, various changes and modifications will become apparent to those skilled in the art. Such changes and modifications are to be understood as being included within the scope of the disclosure.

What is claimed is:

1. A tolerance compensator system fastening components together, the system comprising:
   a threaded stud, including:
      a first end,
      a second end,
      a first portion adjacent to the first end, wherein the first portion is threaded in a first direction,
      a second portion adjacent to the second end, wherein the second portion is threaded in a second direction different from the first direction, and
      a flange arranged between the first portion and the second portion; and
   a nut, wherein the nut is threaded in the second direction;
   wherein:
      when the first portion is at least partially screwed into a threaded hole of a first one of the components, the first portion directly engages the first component without any intermediary member, and the first portion and the threaded hole of the first component have a first coefficient of friction measured between the first portion and the threaded hole of the first component, wherein the first component is a heat sink that is coupled to a printed circuit board via one or more of fixed standoffs; and
      the second portion and the nut have a second coefficient of friction measured between the second portion and the nut, wherein the second coefficient of friction is greater than the first coefficient of friction.

2. The tolerance compensator system of claim 1, wherein the nut is configured to receive the second portion of the threaded stud via the second end of the threaded stud.

3. The tolerance compensator system of claim 1, wherein:
   the first portion extends from the first end to the flange;
   the first portion has a diameter that is constant along a full length of the first portion;
   the second portion extends from the second end to the flange; and
   the second portion has a diameter that is constant along a full length of the second portion.

4. The tolerance compensator system of claim 1, wherein a diameter of the flange is greater than:
- a diameter of the first portion; and
- a diameter of the second portion.

5. The tolerance compensator system of claim 1, wherein:
- the flange has a width that is perpendicular to an axis along the longest dimension of the stud;
- the width of the flange is greater than a diameter of the first portion; and
- the width of the flange is greater than a diameter of the second portion.

6. The tolerance compensator system of claim 1, wherein:
- the first portion is externally threaded in the first direction; and
- the second portion is externally threaded in the second direction.

7. The tolerance compensator system of claim 1, wherein threading of the first portion and threading of the second portion have the same pitch.

8. The tolerance compensator system of claim 1, wherein threading of the nut and threading of the second portion have the same pitch.

9. The tolerance compensator system of claim 1, wherein the flange is not threaded.

10. The tolerance compensator system of claim 1, wherein a top portion of the flange and a bottom portion of the flange are substantially flat.

11. A method for fastening a first component to a second component using a tolerance compensator system, the method comprising:
- inserting a first end of a stud into a threaded hole of the first component, wherein the threaded hole of the first component is threaded in a first direction;
- at least partially screwing a first portion of the stud that is adjacent to the first end of the stud into the threaded hole of the first component, wherein:
  - the first portion is threaded in the first direction,
  - the first portion directly engages the first component without any intermediary member, and
  - the first portion and the threaded hole of the first component have a first coefficient of friction measured between the first portion and the threaded hole of the first component, wherein the first component is a heat sink that is coupled to a printed circuit board via one or more of fixed standoffs;
- inserting a second end of the stud through a hole of a second component and inserting part of a second portion of the stud through the hole of the second component, wherein:
  - the second portion of the stud is adjacent to the second end of the stud, and
  - the second portion of the stud is threaded in a second direction different from the first direction;
- while part of the second portion remains inserted through the hole of the second component, placing a nut onto the second end of the stud, wherein:
  - the nut is threaded in the second direction, and
  - the second portion and a threaded hole of the nut have a second coefficient of friction that is greater than the first coefficient of friction, the second coefficient of friction measured between the second portion and the threaded hole of the nut; and
- rotating the nut to cause:
  - (i) the stud to rotate until a flange of the stud reaches a first side of the second component by partially unscrewing the first portion from the threaded hole of the first component, wherein the flange is arranged between the first portion and the second portion, and
  - (ii) the nut to screw onto the second portion until the nut reaches a second side of the second component, wherein the screwing of the nut onto the second portion until the nut reaches the second side of the second component occurs after the flange of the stud reaches the second component.

12. The method of claim 11, wherein the hole of the second component is not threaded.

13. The method of claim 11, wherein a diameter of the hole of the second component is larger than a diameter of the second portion of the stud.

14. The method of claim 11, wherein inserting the part of the second portion of the stud through the hole of the second component does not include screwing the second portion into the hole of the second component.

15. The method of claim 11, wherein threaded in the first direction is left-hand threaded, threaded in the second direction is right-hand threaded, and rotating the nut includes rotating the nut clockwise.

16. The method of claim 11, wherein the second component is a metal enclosure.

* * * * *